United States Patent
Rao et al.

[11] Patent Number: 6,097,124
[45] Date of Patent: Aug. 1, 2000

[54] HYBRID PERMANENT MAGNET/ HOMOPOLAR GENERATOR AND MOTOR

[75] Inventors: Gita P. Rao, Belmont; James L. Kirtley, Jr., Brookline; David C. Meeker, Brighton, all of Mass.; Kevin J. Donegan, Merrimack, N.H.

[73] Assignee: Satcon Technology Corporation, Cambridge, Mass.

[21] Appl. No.: 08/956,093

[22] Filed: Oct. 23, 1997

Related U.S. Application Data

[60] Provisional application No. 60/029,003, Oct. 23, 1996.

[51] Int. Cl.[7] ................................................. H62K 21/12
[52] U.S. Cl. ........................ 310/156; 310/168; 310/254; 310/258; 310/261
[58] Field of Search .................................. 310/156, 168, 310/254, 261, 258; 29/596, 597, 598

[56] References Cited

U.S. PATENT DOCUMENTS

| | | | |
|---|---|---|---|
| 4,088,177 | 5/1978 | Armstrong et al. | 164/109 |
| 4,150,312 | 4/1979 | Armstrong et al. | 310/42 |
| 4,567,407 | 1/1986 | Ecklin | 318/140 |
| 4,777,397 | 10/1988 | Parshall | 310/156 |
| 4,814,654 | 3/1989 | Gerfast | 310/154 |
| 4,831,300 | 5/1989 | Lindgren | 310/190 |
| 4,837,474 | 6/1989 | Petersen et al. | 310/254 |
| 4,883,981 | 11/1989 | Gerfast | 310/40 R |
| 4,924,125 | 5/1990 | Clark | 310/67 R |
| 4,949,000 | 8/1990 | Petersen | 310/179 |
| 4,959,577 | 9/1990 | Radomski | 310/263 |
| 4,967,096 | 10/1990 | Diemer et al. | 307/19 |
| 5,001,412 | 3/1991 | Carter et al. | 322/10 |
| 5,034,622 | 7/1991 | Kuzmik | 307/149 |
| 5,097,140 | 3/1992 | Crall | 290/36 R |
| 5,140,211 | 8/1992 | Ucida | 310/156 |
| 5,463,262 | 10/1995 | Uchida | 310/156 |
| 5,536,987 | 7/1996 | Hayashi et al. | 310/263 |
| 5,537,025 | 7/1996 | Kern et al. | 322/46 |
| 5,670,838 | 9/1997 | Everton | 310/254 |
| 5,760,520 | 6/1998 | Hasebe et al. | 310/261 |
| 5,786,650 | 7/1998 | Uchida et al. | 310/156 |
| 5,828,153 | 10/1998 | McClelland | 310/168 |

*Primary Examiner*—Elvin Enad
*Attorney, Agent, or Firm*—Dike, Bronstein, Roberts & Cushman, LLP; George W. Neuner; William J. Daley, Jr.

[57] ABSTRACT

Featured is a hybrid permanent magnet/homopolar power producing device and methods related thereto. The device includes first and second portions, the portions being arranged to have a common long axis and so one portion is moving with respect to the other portion. The first portion includes a stator, and a modulating field winding that generates a magnetic field responsive to a DC current therethrough. The second portion includes a support member having a mounting surface, a plurality of permanent magnets and steel poles affixed to the mounting surface, and being arranged thereon so as to form an alteration of steel and permanent magnet poles. The first and second portions and the support member are configured and arranged so each permanent magnet and each steel pole oppose a surface of the stator, so the permanent magnet flux passes between the permanent magnets, the stator and the steel poles, and so the magnetic flux generated by the modulating field winding emerges from each steel pole so as to selectively increase or decrease the permanent magnet flux. The first portion also includes a stator support structure and the first and second portions are configured and arranged so the stator support structure is spaced from the second portion support structure so the flux path between each permanent magnet and an adjacent steel pole is primarily circumferential and so the flux path for flux from the modulating field winding is primarily axial.

11 Claims, 8 Drawing Sheets

6,097,124

HYBRID PERMANENT MAGNET/ HOMOPOLAR GENERATOR AND MOTOR

This application claims the benefit of U.S. Provisional Application Ser. No. 60/029,003 filed Oct. 23, 1996, the teachings of which are incorporated herein by reference.

STATEMENT REGARDING FEDERALLY-SPONSORED RESEARCH

The U.S. Government has paid up a non-exclusive, non-transferable license to practice or have practiced for or on behalf of the United States this invention throughout the world as provided for by the terms of Contract Nos. DAAB07-97-C-6010 and DAAB12-96-C-0001 awarded by the US ARMY CECOM.

FIELD OF INVENTION

The present invention relates to electrical power producing devices alternators or generators using permanent magnets for establishing the excitation magnetic field and more particularly to hybrid permanent magnetic alternators or generators that employ permanent magnets and an adjustable field winding to establish and control the excitation magnetic field. The present invention also relates to hybrid permanent magnet motors and methods related to power production and power utilization.

BACKGROUND OF THE INVENTION

There are a number of alternators and generators (hereinafter power producing devices) known by those skilled in the art for generating either AC or DC electrical power from a source of mechanical energy. One group of power producing devices employs electromagnetic field windings to establish the excitation magnetic field. The excitation magnetic field is the magnetic field that is established to generate electric power by means of rotating or passing conductive material across the magnetic field lines as is known to those skilled in the art. While these power producing devices generally are easy and inexpensive to manufacture, they generally are characterized by being less efficient and bulkier as compared to power producing devices that employ permanent magnets to establish the excitation magnetic field, a second group of power producing devices hereinafter permanent magnet (PM) devices.

The permanent magnet devices also are advantageous because power is not provided to the rotor and there are no ohmic losses on the rotor. As a result, there is no need for rotating windings and an exciter or brushes to communicate the electric power to the rotating windings to establish a magnetic field. This advantage is important for reliability and size of power producing devices in general. For example, in an environment where moisture, mud or dirt can be present, the elimination of exciters and brushes reduces the chance of electrical shorting and failure of the power-producing device. The lack of ohmic losses improves the overall efficiency and simplifies cooling of the power-producing device.

Although the permanent magnet devices have desirous characteristics, they do have shortcomings or design characteristics unique to this group of power producing devices. Typically there is little or no control of the field strength for the excitation magnetic field, and hence the terminal voltage, because the field is being produced by permanent magnets. As a result, the terminal voltage also will vary as a function of the rotational speed of the rotor, stator or load current and/or the operating temperature of the magnets.

Also, because of the low synchronous reactance and the fact that a permanent magnet generated field cannot be turned off, currents are typically very high if there is a short circuit fault. Further, permanent magnets are susceptible to demagnetization, if they operate against a strong opposing armature reaction or at too high a temperature. The magnetic characteristics of permanent magnets typically vary as a function of temperature and age, as such; power output and the terminal voltage will vary as a function of the temperature of the magnet as well as its age. This temperature dependency also imposes limits on the magnetic materials selected for use as a mechanism for minimizing the temperature effect.

There is shown in FIG. 1, an elementary schematic cross-sectional elevation view of a permanent magnet biased, brushless synchronous motor/generator 1 developed for a flywheel energy system. This motor/generator 1 includes a stator 2 and a rotor 3. The stator 2 includes a single stator winding 4 that is wound so it lies within the rotor 3 and between the two sections or ends 5a,b of the rotor.

At each end 5a,b of the rotor 3 is an alternation of magnetic steel poles 7 and permanent magnetic poles 6 where one end 5b of the machine is configured with all "north" permanent magnets and the other end 5a with all "south" permanent magnets. Also, the permanent magnet poles 6 at one end 5a are aligned with the magnetic steel poles 7 at the other end 5b. Further, at the end 5b with the "north" permanent magnetic poles 6, the magnetic steel poles 7 at that end become south poles and vice-versa for the other end 5a.

An electromagnetic field winding 8 is disposed between the magnetic steel poles 7 and the permanent magnet poles 6 and is configured to push flux axially. When the field winding 8 is not energized, each end 5a,b is independent. The flux being pushed axially also is pushed only through the salient magnetic steel poles 7 at either end 5a,b so as to either enhance (i.e., boost) or reduce (i.e., buck) the flux being produced by the permanent magnet poles 6.

The field windings 8 for the motor/generator 1 provide a means for adjusting or modulating the excitation flux so the magnitude of the terminal voltage remains essentially constant during variable speed conditions. However, this motor/generator 1 because of its configuration and design yields a rather complex flux path and a device that imposes limitations on axial length. Its complex design also makes its manufacture costly and time consuming.

It thus is desirable to have a permanent magnet power producing device in which the excitation field is adjusted or modulated to compensate for load current changes and/or variable speed inputs that drive the device as well as for temperature, wear and variations in the magnetic characteristics of the permanent magnets. It would be particularly desirable for such a permanent magnet device to be capable of effectively nullifying the magnetic field being produced by the permanent magnets so as to shut off the power-producing device. It also would be desirable to have a permanent magnet motor that is configured with permanent magnets and a means for adjusting or modulating the magnetic field being produced thereby to yield a variable speed motor. Such power producing devices and motors preferably would be simple in construction and assembly as compared to other such power producing devices and permanent magnet motors as are known in the art.

SUMMARY OF THE INVENTION

The present invention features a device for producing electrical power, either DC or AC, and AC or DC electrical motors, in particular variable speed motors, that are configured similar to the power producing device. The power-producing device of the present invention includes a stationary part and a moving part. In one aspect of the present invention, the stationary part includes a stator and a modulation electromagnetic field winding and the moving part includes a rotor, a plurality of steel poles and a plurality of permanent magnet poles. Alternatively, the constitution of the moving and stationary parts is reversed (e.g., the moving part includes the stator and the stationary part the permanent magnet and steel poles).

The plurality of steel and permanent magnet poles are affixed to the surface of the inside diameter of the rotor and arranged so as to form an alternation of steel and permanent magnet poles. Alternatively, the steel poles are integrally formed with the member constituting the rotor. The stationary part and the moving part are arranged so the steel and magnetic poles extend along a long axis of the stator and so the steel and magnetic poles rotate about the stator. In an alternative embodiment, the stationary and moving parts are arranged so the stator is disposed about and along the length of the rotor. Also, the permanent magnet poles and steel poles are disposed on the outside diameter of the rotor.

The stationary and moving parts also are arranged and configured so flux from the modulation electromagnetic field winding passes through each of the steel poles. Additionally, the modulation field winding is operated so as to selectively increase or decrease the magnitude of the flux emerging from the steel poles, thereby causing the peak-to-peak amplitude of the net air gap flux density to increase or decrease. The power-producing device in more particular embodiments further includes control circuitry to control the flux emerging, from the steel poles and thereby also control or regulate an output parameter, for example the terminal voltage. More specifically, the control circuitry controls the electrical current passing through the modulation field winding so as to adjust or regulate the flux emerging from the steel poles. For example, the control circuitry controls the winding current so the terminal voltage remains essentially constant regardless of the load current, the rotational speed of the rotor and/or the operational temperature of the permanent magnets.

The stator includes a core, preferably comprising a stack of laminations, with semi-open slots on the surface opposing the rotor inner diameter. The stator also includes electrical windings that are placed or disposed in these slots. More particularly, the wound metal core comprising the stator essentially forms a rigid cylindrical structure disposed within the moving part.

In a second aspect of the present invention, the power producing device is a multi-phase power source providing N electrical outputs, where N is at least 2. The stator includes X*N windings disposed within the slots, that are connected to the N phases of the power output and where X is a predetermined integer. Further, the rotor carries k permanent magnet poles and k steel poles each being disposed at a radial distance from an axis of concentricity for the rotor and stator, where k is an integer≧2 and preferably an integer≧3.

In a third aspect of the present invention, the moving part further includes a rotating back iron for the stator that is affixed to the rotor. In this way, the stator rotating back iron rotates along with the permanent magnet poles and the steel poles. This reduces the iron losses in comparison to a non-rotating back iron. The stator rotating back iron is disposed so it is proximate a side of the stator that is opposite to the permanent magnet and steel poles.

A fourth aspect of the present invention features a hybrid permanent magnet/homopolar motor that includes a stationary part and a moving part. The stationary part including a stator and a modulation electromagnetic field winding and the moving part includes a rotor, a plurality of permanent magnet poles and a plurality of steel poles. Reference should be made to the foregoing discussion regarding the power producing devices of the present invention that apply equally for a hybrid permanent magnet/homopolar motor of the present invention.

More particularly, the hybrid permanent magnet/homopolar motor of the present invention is powered by a multi-phase power source having N electrical outputs, where N is at least 2. The stator includes X*N windings disposed within the slots, that are successively and repeatedly connected to the N phases of the power output and where X is a predetermined integer. Further, the rotor carries k permanent magnet poles and k steel poles each being disposed at a radial distance from an axis of concentricity for the rotor and stator, where k is an integer≧2 and preferably an integer≧3.

Other aspects of the invention are discussed below.

BRIEF DESCRIPTION OF THE DRAWING

For a fuller understanding of the nature and desired objects of the present invention, reference is made to the following detailed description taken in conjunction with the accompanying drawing figures wherein like reference character denote corresponding parts throughout the several views and wherein.

DESCRIPTION OF THE PREFERRED EMBODIMENT

Figure 1:
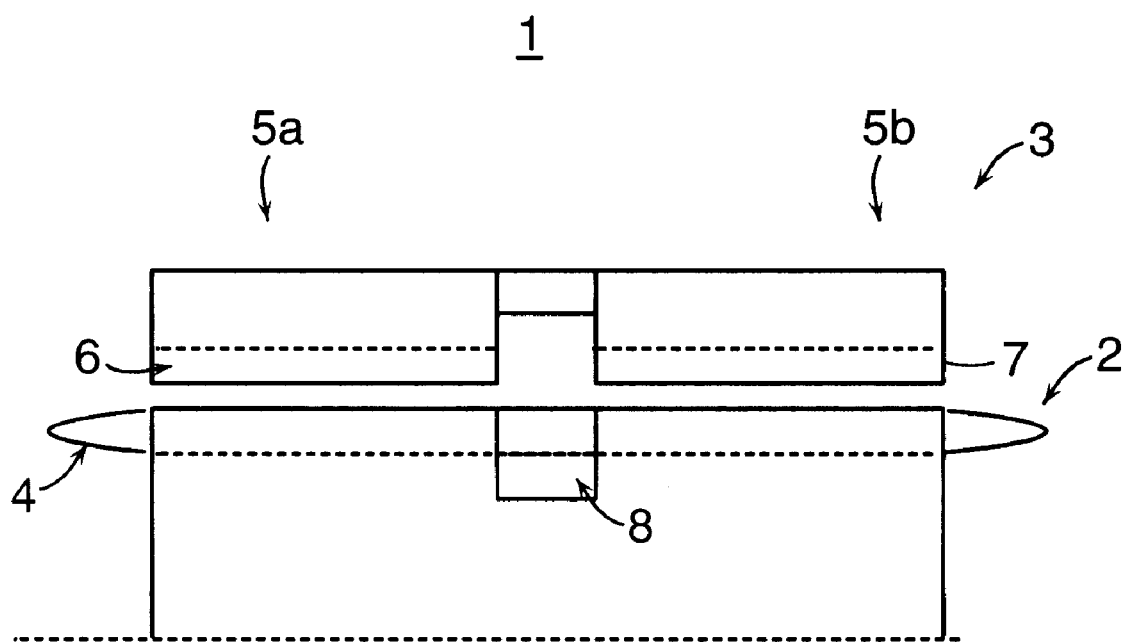
FIG. 1 is an elementary schematic cross-sectional elevation view of a permanent magnet biased motor/generator.
Figure 2A:
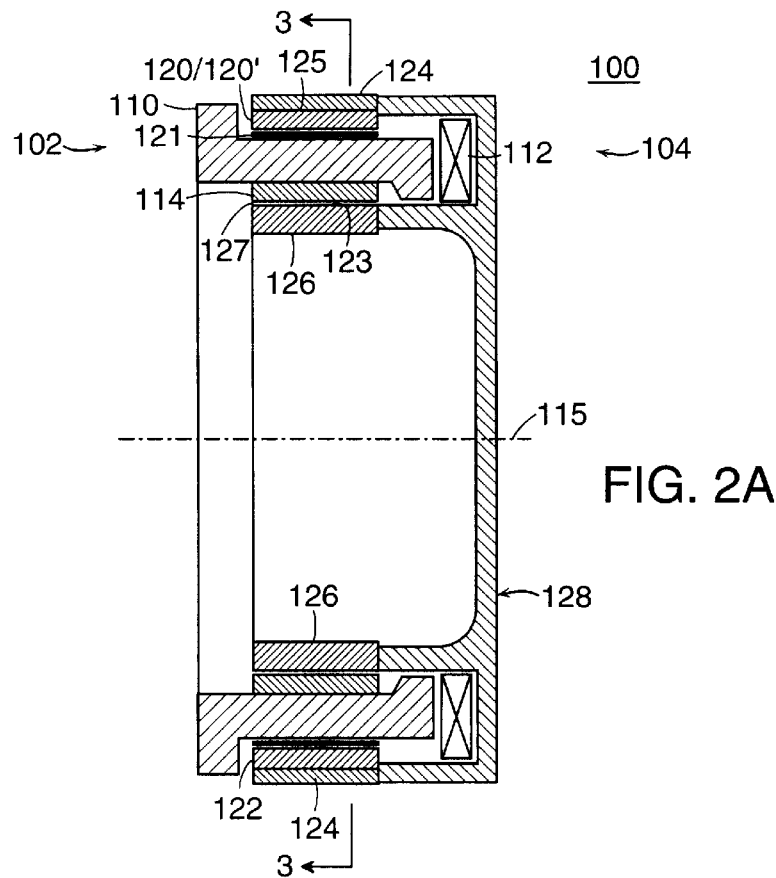
FIG. 2A is a simplified schematic cross-sectional elevation view of a first embodiment of a hybrid permanent magnet generator according to the instant invention.
Figure 3:
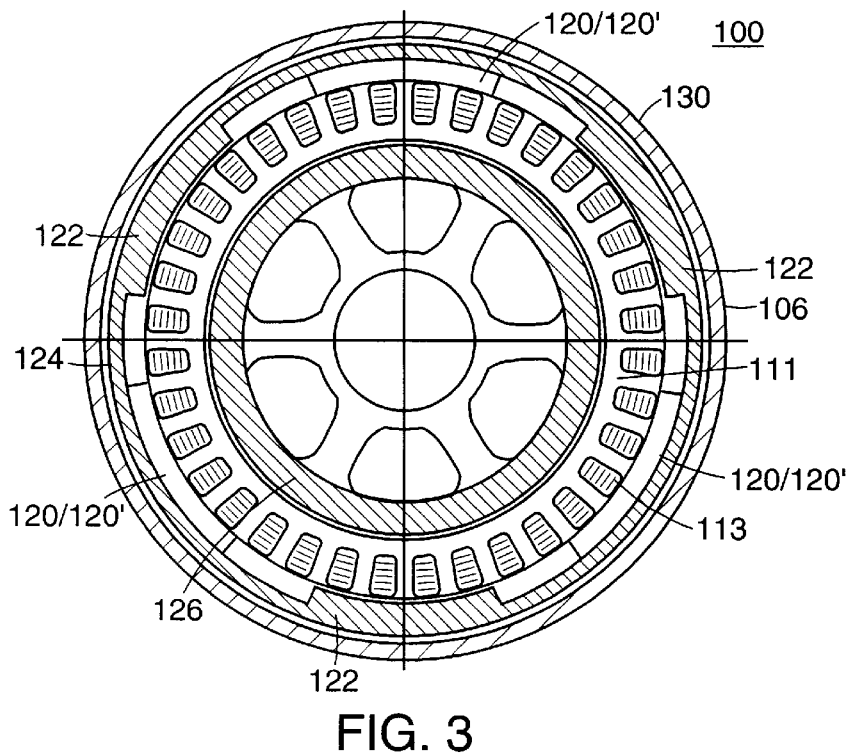
FIG. 3 is a cross section view of a hybrid permanent magnet generator along line 3—3 of FIG. 2.

Referring now to the various figures of the drawing wherein like reference characters refer to like parts, there is shown in FIGS. 2A and 3 one aspect of a hybrid permanent magnet/homopolar generator 100 of the present invention. The hybrid permanent magnet/homopolar generator 100 includes a stationary part 102 and a moving part 104. The stationary part 102 includes a stator 110 a stator support structure 114 and a modulating field winding 112. As more clearly seen in FIG. 3, the stator 110 includes a stator core 111, having a plurality of slots in one surface thereof and which extend axially and along the length of the metal core, and stator windings 113. The stator core 111, in an exemplary embodiment is a punched stack of laminations of silicon steel that is mounted on a hub or stator support structure 114 and is epoxy impregnated The stator core 111, however, can be manufactured using any of a number of materials and techniques known to those skilled in the art.

Also, and using any of a number of manufacturing techniques known to those skilled in the art, the slotted structure of the stator core 111 is wound with a conductive material, for example copper wire, so as to yield a stator 110 having polyphase windings. In a particular embodiment, the stator core 111 is wound so as to yield a stator having three phase windings. The stator windings 113, as shown in FIG. 3, are wound about the stator core 111 so the windings are disposed below the surface opposing the permanent magnet poles 120 and steel poles 122. The end turns for the stator windings 113 extend axially beyond the stator core 111 (e.g., see FIG. 6A). After winding the stator core 111, the stator 110 preferably is encapsulated with a rigid epoxy material, so as to further stiffen the structure comprising the stator.

The hub or stator support structure 114 preferably is a relatively thin member, for example a carbon steel cylindrical tube, that is provided for mechanical support of the stator 110 and the modulating field winding 112. As such, the stator support structure 114 should see only the relatively modest pulsations of the homopolar field, being generated by the modulating field winding 112, resulting in relatively low eddy current losses. In this aspect of the invention the stator rotating back iron 126 is the main flux return path for the permanent magnet return flux and the axial return flux of the modulating field winding 112. The support structure 114 is secured to an end plate or structure of the housing 230 (see for example FIGS. 6A,B and 7).

The modulating field winding 112 is a toroidal electromagnetic winding, as is known in the art that is disposed about the common axis of concentricity 115, also the axis of rotation for the rotating member 128. The modulating field winding 112 is excited by a DC current and produces a magnetic flux whose path, as shown in FIG. 4A passes through the rotating support member 128, thence through the pole back iron 124 and a steel pole 122. The flux path then crosses the air gap between the stator 110 and the steel pole 122, passes through the stator and crosses the air gap between the stator 110 and the stator back iron 126. The flux path then passes through the stator back iron 126 and thence back to the rotating member 128. As explained hereinafter, the DC current flowing through the modulating field winding 112 is selectively and repeatedly adjusted during use/power production so as to control the flux emerging from the steel poles 122 and thereby effect a control over the magnetic field produced by the permanent magnets 120.

Referring back to FIGS. 2A and 3, the moving part 104 includes a plurality of permanent magnets 120, a plurality of steel poles 122, a pole back iron 124, a stator back iron 126 and a rotating member 128. The rotating member 128 is a cup shaped member to which is secured the pole back iron 124 and the stator back iron 126. Both the pole and stator back iron 124, 126 are secured to the rotating member 128 so opposing surfaces 125, 127 of each are parallel to the axis of concentricity 115. In a more specific aspect of the present invention, the rotating support member 128 and both the pole and stator back iron 124,126 form a unitary structure, for example, a low carbon steel casting.

As indicated above, the moving part 104 includes a plurality of permanent magnets 120 and a plurality of steel poles 122 that are affixed to the pole back iron inner surface 125. In a more specific embodiment, the steel poles 122 and the pole back iron 124 form a unitary structure as illustrated in FIG. 3 with the stator back iron 126 and the rotating support member 128. The permanent magnets 120 are affixed to the inner surface 125 of the pole back iron 124 using any of a number means known to those skilled in the art, including high temperature, flexible adhesives or end clips that are secured mechanically (e.g., screwed) to the pole back iron so as to form a plurality of permanent magnet poles 120'. The end clips or mechanical retainers are made from non-magnetic materials, preferably non-conductive materials, such as fiber reinforced plastics.

As also illustrated in FIG. 3, the steel poles 122 and permanent magnet poles 120' are arranged about the pole back iron inner surface 125 so they alternate about the inner surface and extend radially inward so they are spaced a distance away from the opposing surface of the stator 110 thereby forming an air gap therebetween. In this way, a plurality of poles are established on the pole back iron inner surface 125 for establishing the desired excitation field. The permanent magnets 120 also are arranged on the pole back iron inner surface so they form permanent magnet poles 120' that are all of the same magnetic polarity, for example all "north" poles, and the steel poles 122 are correspondingly all of the opposite magnetic polarity, for example all "south" poles, depending on the effect of the modulating field winding 113. For purposes of the detailed discussion, the numbering convention 120 and 120' is used to distinguish the permanent magnets 120 and the permanent magnet poles 120', respectively.

The arc length of the exposed pole surfaces 121,123 through which magnetic flux emerges and the thickness of the permanent magnets 120 and the steel poles 122 are selected to establish the desired magnetic field for production of electric power or, in the case of a motor, rotary motion of an output shaft. Regardless of the specified arc length or thickness, the permanent magnetic poles 120' and the steel poles 122 are arranged about the pole back iron inner surface 125 so the long axis or centerline of each magnet pole 120' is equiangular spaced from the long axis or centerline of an adjacent steel pole 122.

Figure 4B:
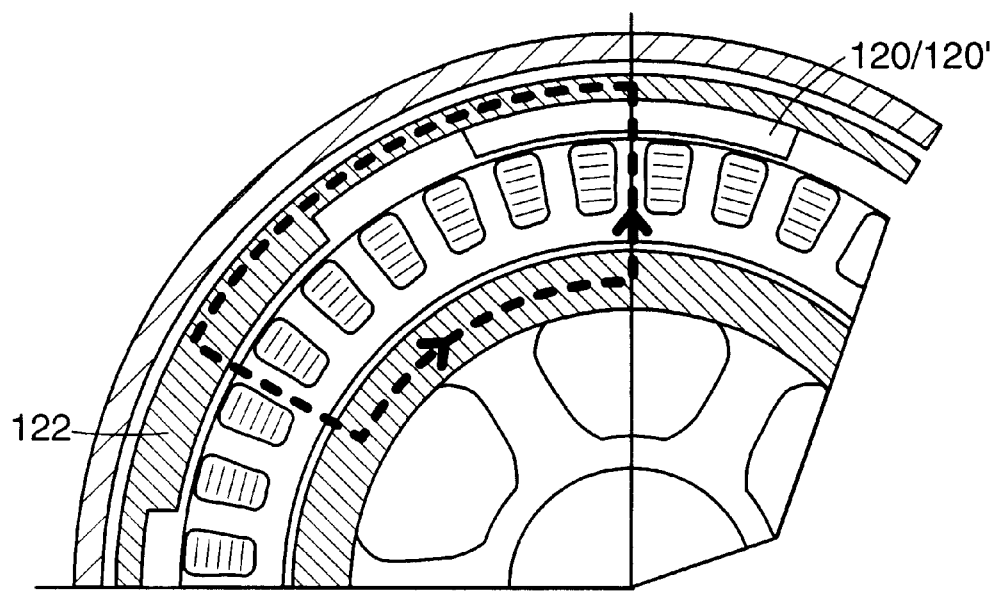
FIG. 4B is a cross-sectional view of a portion of the hybrid permanent magnetic generator of FIG. 3 to illustrate the flux path between the permanent magnet poles and the magnetic steel poles.
Figure 4A:
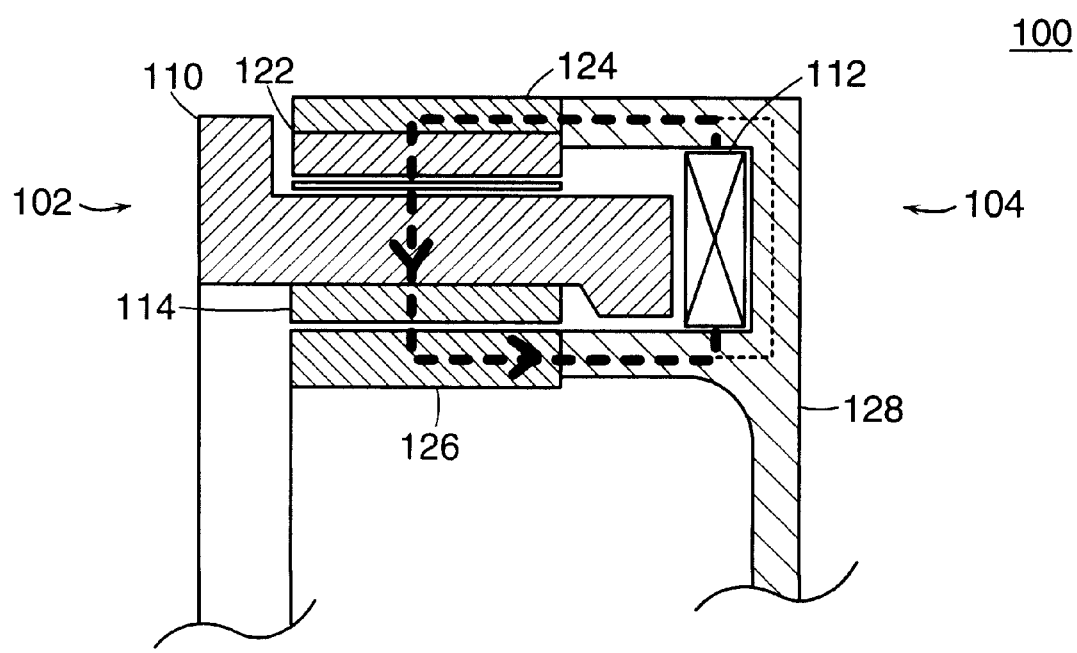
FIG. 4A is a cross-sectional view of a portion of the hybrid permanent magnetic generator of FIG. 3 to illustrate the flux path to/from the modulating field windings.

As shown in FIG. 4B, the magnetic flux path for a permanent magnet/steel pole pair crosses the air gap between the stator 110 and the permanent magnet pole 120', passes through the stator and thence through the stator back iron 126. The flux path then passes back through the stator 110 and across the air gap to an adjacent steel pole 122. The flux path then continues through the steel pole and the pole back iron 124 to the originating permanent magnet pole 120'.

As such, and as shown in FIGS. 2A and 3, the hybrid permanent magnet/homopolar generator 100 of the present invention has an "inside-out" design in that the permanent magnet and steel poles 120',122 face radially inward toward the outer diameter of the outward facing stator 110. Additionally, the rotating member 128 and the stator back iron 126 wraps around one end of the stator 110 and inside the wound stator. With this topology, the permanent magnet fluxes and the stator reaction fluxes would act as they do in any electric machine except that in the present invention, a homopolar flux produced by the modulating field winding 112 is superimposed on top of the permanent magnet and stator reaction fluxes.

Figure 2B:
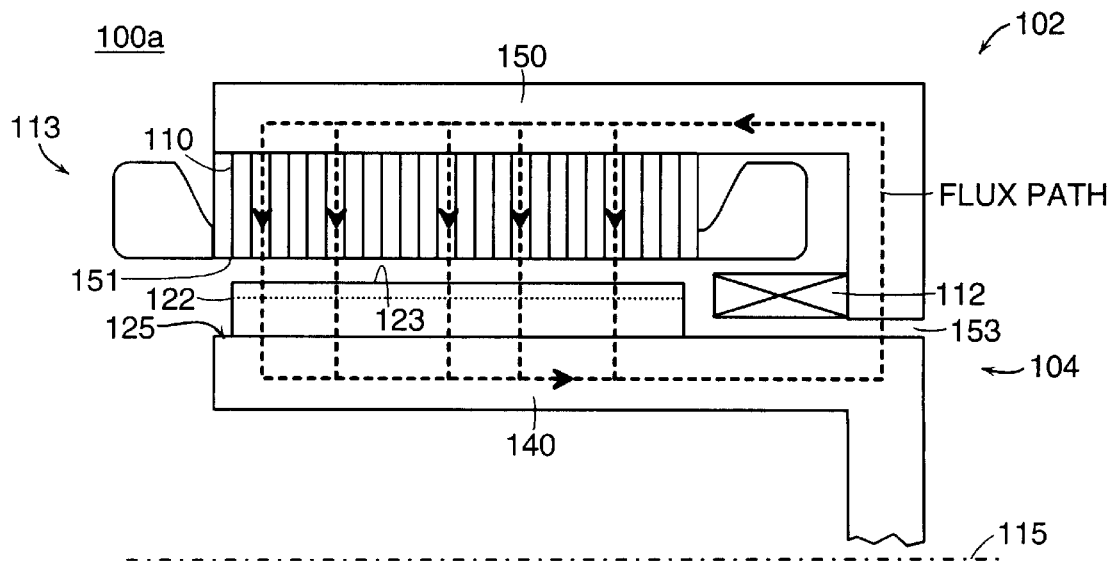
FIG. 2B is a simplified schematic cross-sectional elevation view of an alternate embodiment of a portion of a hybrid permanent magnet generator.

Now referring to FIG. 2B, there is shown a schematic cross-section elevation view of a portion of an alternate embodiment of a hybrid permanent magnet/homopolar generator 100a to that shown in FIG. 2A, the portion including a steel pole 122. This hybrid permanent magnet/homopolar generator 110a, includes a stationary part 102 and a moving part 104 that are arranged about a common axis of concentricity and so the generator has an "outside-in" design where the permanent magnet and steel poles 120',122 face radially outward towards an inwardly facing surface 151 of the stator 110. In this embodiment, the stationary part 102 includes a stator, a modulating field winding 112 and a stator back iron support structure 150; and the moving part 104 includes a plurality of permanent magnets 120 (see FIG. 2A), a plurality of steel poles 122, and a rotor 140.

The stator back iron support structure 150, serves a number of functions including; providing mechanical support for the stator 110 and modulating field winding 112 and constituting a part of the flux path for the permanent magnet flux and the modulating field winding DC flux. As such, the stator back iron support structure 150 is made from any of a number of materials known in the art that exhibit the desired structural and magnetic characteristics to perform these multiplicity of functions, for example, a low carbon steel casting.

The modulating field winding 112 is a toroidal electromagnetic winding, as is known in the art, that is excited by a DC current and produces a magnetic flux whose path, as shown in FIG. 2B passes through the stator back iron support structure 150, thence through the stator 110 and across the air gap between the stator and the steel pole 122. This DC flux path continues through the steel pole and thence through the rotor 140 across another air gap 153 and thence back to stator back iron support structure 150. The air gap 153 between the rotor 140 and the stator back iron support structure is sized so the flux path between adjacent permanent magnets and steel poles 120',122 (i.e., pole pair) is primarily circumferential, in the fashion described below, and so the permanent magnet flux does not flow through the DC flux path. Additionally, the air gap 153 is sized to minimize DC current requirements for the modulating field winding 112.

The permanent magnet flux path for a given permanent magnet/steel pole pair crosses the air gap between the stator and a permanent magnet pole 120', passes through the stator 110 and thence through the stator back iron support structure 150. The flux path then continues back through the stator 110 and across the air gap to a steel pole 122 adjacent to the originating permanent magnet pole 120'. The flux path then continues through the steel pole 122 and through the rotor 140 to the originating permanent magnet pole 120'.

As described hereinabove, the modulating field winding 112 of this hybrid permanent magnet/homopolar generator 100a is operated and configured so as to adjust or regulate the flux emerging from the steel poles 122 and thereby adjusts or controls the terminal voltage being outputted by the generator. Reference should be made to the foregoing discussion regarding FIGS. 2A and 3 for further details regarding the design and configuration of the modulating field winding 112 to control the emerging flux so as to compensate for varying rotational speeds of the rotor 140, varying temperatures of the permanent magnets 120, material variations in the permanent magnets, to provide a mechanism for shutting-off the generator 100a under certain circumstances and to provide regulation under changing load conditions.

Figure 5:
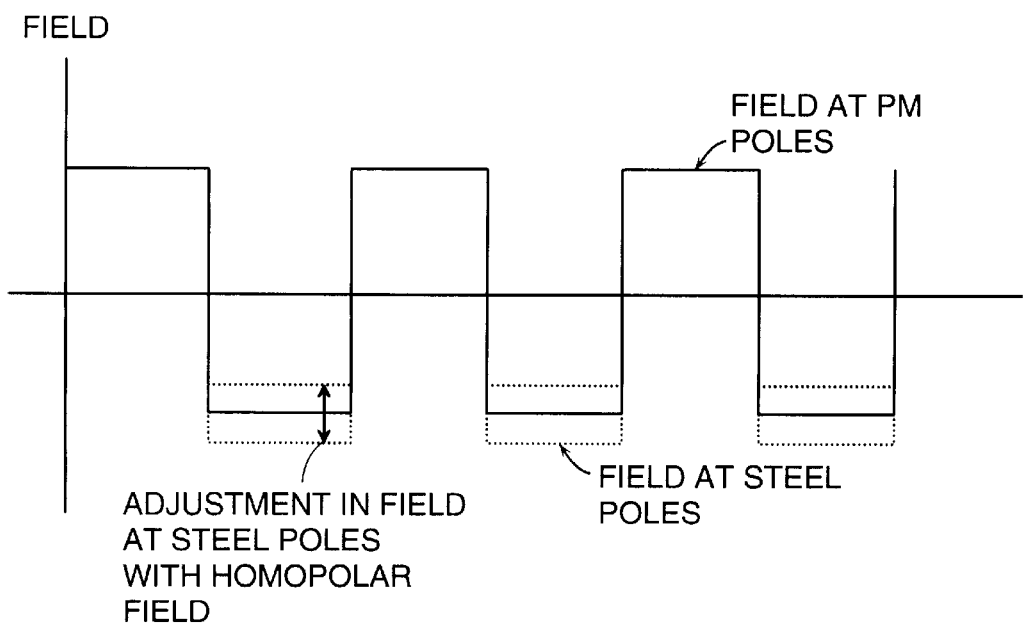
FIG. 5 is a schematic graphical illustration of the magnetic field flux emerging from the permanent magnet poles and the magnetic steel poles.

As graphically shown in FIG. 5, adjusting the DC current passing through the modulating field winding 112 has the effect of relatively raising or lowering the flux emerging from the steel poles 122. This adjustment also causes the peak-to-peak amplitude of the net air gap flux density to increase or decrease. Because the time rate of change of flux linked by the stator is proportional to this amplitude, the adjustment of the flux also provides a means by which the terminal voltage outputted by the generator can be adjusted or regulated. In effect, the modulating field winding 112 controls the magnetic field produced by the permanent magnet 120.

As such, the modulating field winding 112 is preferably configured so as to generate a flux that is sufficient to at least increase or decrease (i.e. buck) the net air gap flux density to compensate for changes to the terminal voltage that can occur because of the changes in rotational speed of the rotating member 128 and/or the changes in magnetic characteristics of the permanent magnets due to operating temperature, aging and/or load current. Additionally, the modulating field winding 112 is preferably configured so the DC current through it can generate a flux that in effect nullifies the flux being outputted by the permanent magnets so the modulating field winding 113 can be used in effect to shut-off the generator under certain conditions. This is particularly advantageous because the generator 100 can be shut-off to prevent damage and minimize safety risks, when short circuit conditions are found to exist. This "shutting-off" feature can be used to complement or supplement clutching/de-clutching mechanisms 252 (FIG. 7); the mechanisms used to engage/disengage the rotating member of a generator from the source of mechanical power.

The permanent magnets 120 used in the above-described generator 100 can be formed using any of a number of materials known to those skilled in the art. Preferably, the permanent magnets 120 are made from any of the hard permanent magnetic materials including ceramics, ferrites such as strontium or barium ferrites and rare-earth/transition metal such as samarium cobalt and neodymium iron boron (i.e., NdBFe). The permanent magnet material selected is optimized for the specific use giving consideration to operating temperature, other design considerations and the regulatory or modulating effect of the modulating field winding 112. In an exemplary embodiment, a 32 MGOe NdBFe permanent magnet is used in a hybrid permanent magnet/ homopolar generator having six poles (i.e. 3 magnet and 3 steel poles) that produces 10 kW of power at a terminal voltage of 120 Vac at a rotational speed of about 1200 rpm. The modulating field winding for such a generator also is configured so this terminal voltage can be maintained when the stator current changes due to load changes, when rotational speeds are increased or decreased and/or when the temperature of the permanent magnets changes.

In contrast to known permanent magnet generators, the hybrid/homopolar features of the present invention allow a wide range of materials to be used because the magnitude of the electromagnetic field produced by the modulating field winding 112 can be adjusted to compensate for changes in the magnetic characteristics of the permanent magnets 120 resulting from any of a number of factors including changes in temperature. For example, a neodymium iron boron permanent magnetic could be used in an application where there is a wide range of temperature variation because the modulating field winding 113 would adjust the flux emerging from the steel poles 122 so the flux density. In contrast, for prior art permanent magnet generators, the material of choice for wide temperature variations typically is samarium cobalt which is significantly more expensive than neodymium iron boron.

Figure 6A:
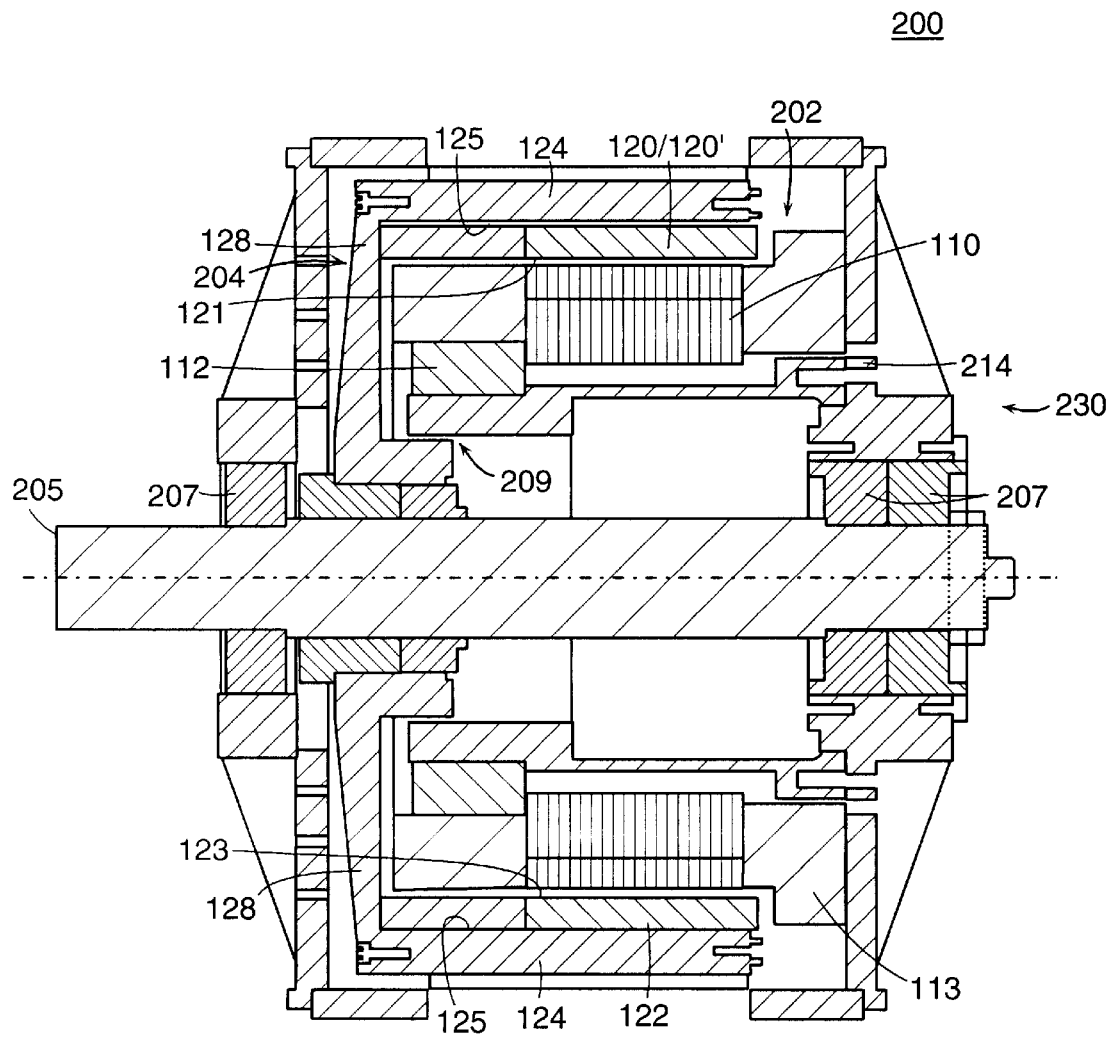
FIG. 6A is a schematic cross-sectional elevation view of a second embodiment of a hybrid permanent magnet generator according to the instant invention.

There is shown in FIG. 6A a schematic cross-sectional elevation view of a second aspect of a hybrid permanent magnet generator 200 according to the instant invention. In the following detailed description reference is made to the reference characters/numerals denoted in FIGS. 2A and 3 for corresponding parts. As such, reference shall be made to the foregoing discussion for FIGS. 2A and 3 for these items/parts. The hybrid permanent magnet/homopolar generator 200 includes a stationary part 202, a moving part 204, a drive shaft 205, shaft bearings 207 and a housing 230. The drive shaft 205 is mechanically interconnected to the moving part, specifically the rotating member 128 thereof, and to an external power source of mechanical energy (not shown).

The stationary part 202 includes a stator 110, a stator back iron support structure 214 and a modulating field winding 112. As with the stator 110 hereinabove described, the stator 110 includes a stator core 111, having a plurality of slots in one surface thereof and which extend axially and along the length of the metal core, and stator windings 113. The stator 110 and the modulating field winding 112 are secured mechanically to the stator back iron support structure 214.

The stator back iron support structure 214 serves a number of functions including; providing mechanical support for the stator 110 and modulating field winding 112 and constituting a part of the flux path for the permanent magnet flux and the modulating field winding DC flux. The stator back iron support structure 214 also includes passages therein for routing of electrical wiring, such as power leads to the modulating field winding 112. As such, the stator back iron support structure 214 is made from any of a number of materials known in the art that exhibit the desired structural and magnetic characteristics to perform these multiplicity of functions, for example, the support structure 214 is a low carbon steel casting.

Figure 6B:
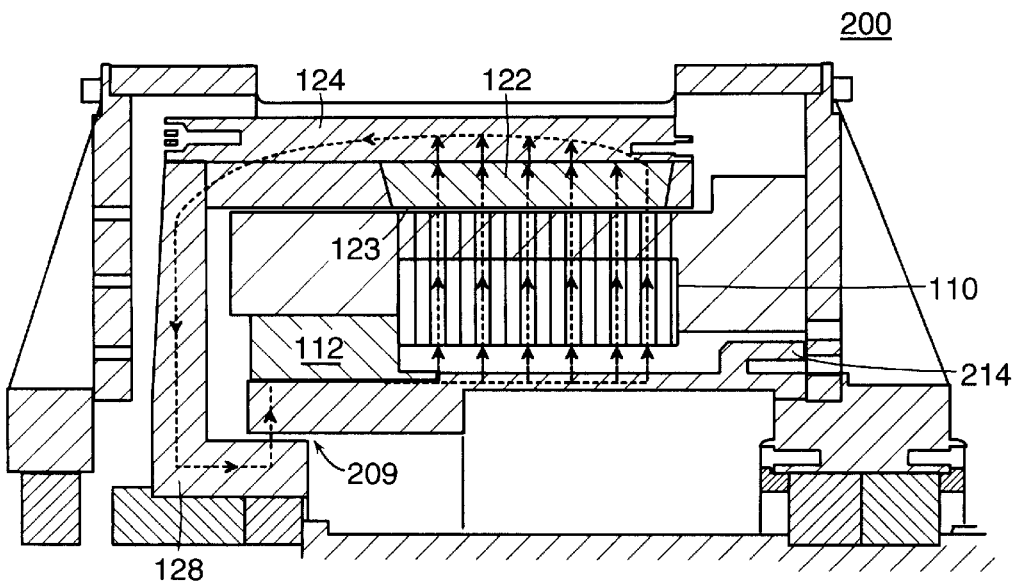
FIG. 6B is a cross-sectional view of a portion of the hybrid permanent magnetic generator of FIG. 6A to illustrate the flux path to/from the modulating field winding.

The modulating field winding 112 is a toroidal electromagnetic winding, as is known in the art, which is disposed about the drive shaft rotational axis 215. The modulating field winding 112 is excited by a DC current and produces a magnetic flux whose path, as shown in FIG. 6B passes through the stator back iron support structure 214, thence through the stator 110 and across the air gap between the stator and the steel poles 122. This DC flux path continues through the steel pole and thence through the pole back iron 124 to the rotating member 128. The flux path continues through the rotating member and crosses the air gap 209 between the rotating member and the modulating field winding 112.

The air gap 209 between the rotating member 128 and the modulating field winding 112 is sized so the flux path between adjacent permanent magnets and steel poles 120', 122 (i.e., pole pair) is primarily circumferential, in the fashion described below, and so the permanent magnet flux does not flow through the DC flux path. Additionally, the air gap 209 is sized to minimize DC current requirements for the modulating field winding 112. As explained hereinabove, the DC current flowing through the modulating field winding 112 is selectively and repeatedly adjusted during use so as to control the flux emerging from the steel poles 122 and thereby effect a control over the magnetic field/flux being produced by the permanent magnets 120.

Referring back to FIG. 6A, the moving part 204 includes a plurality of permanent magnets 120/permanent magnet poles 120', a plurality of steel poles 122, a pole back iron 124, and a rotating support member 128. The rotating support member 128 is a cup shaped member to which is secured the pole back iron 124 using any of a number of means known in the art, for example a bolted connection. The pole back iron 124 is secured to the rotating support member so the inner surface 125 of the pole back iron is parallel to the axis of rotation 215. Alternatively, and as shown in FIGS. 2A and 3, the rotating support member 128 and the pole back iron 124 can form a unitary structure from, for example, a low carbon steel casting.

As described hereinabove, and illustrated in FIG. 3, the steel poles 122 and the permanent magnet poles 120' are arranged about the pole back iron inner surface 125 so they alternate about the inner surface and extend radially inward. Thus, the inner surfaces 121,123 of the permanent magnet poles 120' and the steel poles 122 are spaced a predetermined distance from the outer diameter or opposing surface of the stator 110, thereby forming an air gap therebetween. In this way, a plurality of poles 120', 122 are established on the pole back iron inner surface 125 for establishing the desired excitation magnetic field. The polarity arrangement of the permanent magnet poles 120' and the steel poles 122 is as described above.

Referring back to FIG. 6A, the magnetic flux path for a permanent magnet/steel pole pair crosses the air gap between the stator 110 and the permanent magnet pole 120', passes through the stator and thence through the stator back iron support structure 214. The flux path then passes back through the stator 110 and across the air gap to a steel pole 122 adjacent to the originating permanent magnet pole 120'. The flux path then continues through the steel pole 122 and the pole back iron 124 to the originating permanent magnet, 120.

As described hereinabove, the modulating field winding 112 of this hybrid permanent magnet/homopolar generator 200 is operated and configured so as to adjust or regulate the flux emerging from the steel poles 122 and thereby adjusts or controls the terminal voltage being outputted by the generator. Reference should be made to the foregoing discussion regarding FIGS. 2A and 3 for further details regarding the design and configuration of the modulating field winding 112 to control the emerging flux so as to compensate for varying rotational speeds of the drive shaft 205, varying temperatures of the permanent magnets 120, material variations in the permanent magnets, and to provide a mechanism for shutting-off the generator 200 under certain circumstances and providing regulation under changing load conditions.

The drive shaft 205 can be made of any of a number of materials known in the art that can satisfy the structural design requirements for the intended service. The drive shaft bearings 207 are any of a number of mechanisms or bearings known in the art that maintain a drive shaft in a proper alignment for rotation while minimizing rotational friction losses. For example, the bearings can be standard, angular contact, grease packed bearings such as those employing ball bearings. The shaft 205 also is interconnected to the mechanical power source, such as the output shaft of a motor, by means of a flexible coupling or other means known to those skilled in the art, for example a pulley and drive belt arrangement.

Figure 7:
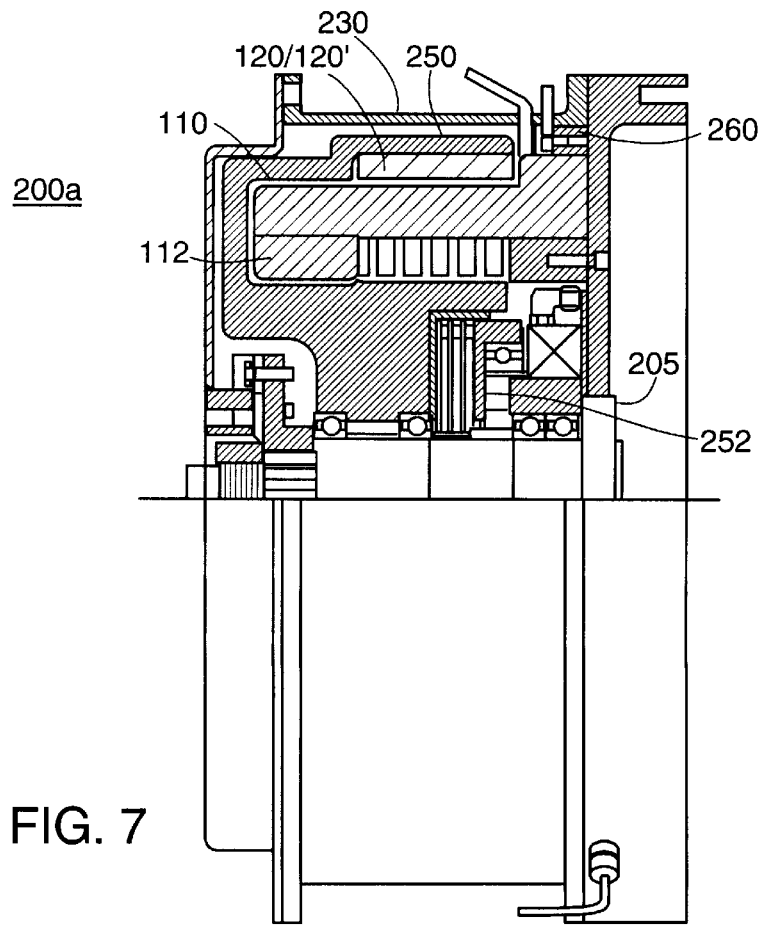
FIG. 7 is a side view of an alternative embodiment of the hybrid permanent magnet/homopolar generator of FIG. 6A with a partial cross sectional breakaway.

Now referring to FIG. 7, there is shown an alternative hybrid permanent magnet/homopolar generator 200a to that shown in FIG. 6A. This generator 200a differs in two particular respects from that shown in FIG. 6A in that the generator includes a rotor 250 and a water-cooled cold plate 260. The rotor 250 is a unitary structure that replaces the rotating member 128 and the pole back iron 124 shown in FIG. 6A.

The water cooled cold plate 260 is placed in contact with the one set of the end turns of the stator 110 so the heat being generated by the stator and other components of the generator 110 is sunk to the cold plate and dissipated by the cooling water flowing therein. The water cooled cold plate 260 includes thin wall tubing that is cast into an aluminum ring, or other metal ring, which is placed in contact with the end turns of the stator 110. Alternatively, the water-cooled cold plate 260 includes one or more, preferably two or more circular loops of thin wall tubing with 3–5 mils of Ultem film insulation. Providing a mechanism for heat dissipation is advantageous in a number of respects, including improving reliability and maintaining the permanent magnets below their temperature capabilities as well as reducing the energy requirements for the modulating field winding 112. Reference should be made to the foregoing discussion for FIG. 6A for other details of the hybrid permanent magnet/homopolar generator 200a of this embodiment.

In a more general aspect, a hybrid permanent magnet/homopolar generator 100, 200, 200a of the present invention is a multi-phase power source that is configured to provide N electrical outputs, where N is at least 2. The stator 110 includes X*N stator windings 113 disposed within the slots of the stator core 111, where X is a predetermined integer. The stator windings 113 are connected to the N phases of the power output. Further, the pole back iron 124 carries k permanent magnet poles 120' and k steel poles 122 each being disposed at a radial distance from the axis 115 of concentricity for the rotating member 128 and stator 110, where k is an integer≧2, preferably an integer≧3.

Figure 8:
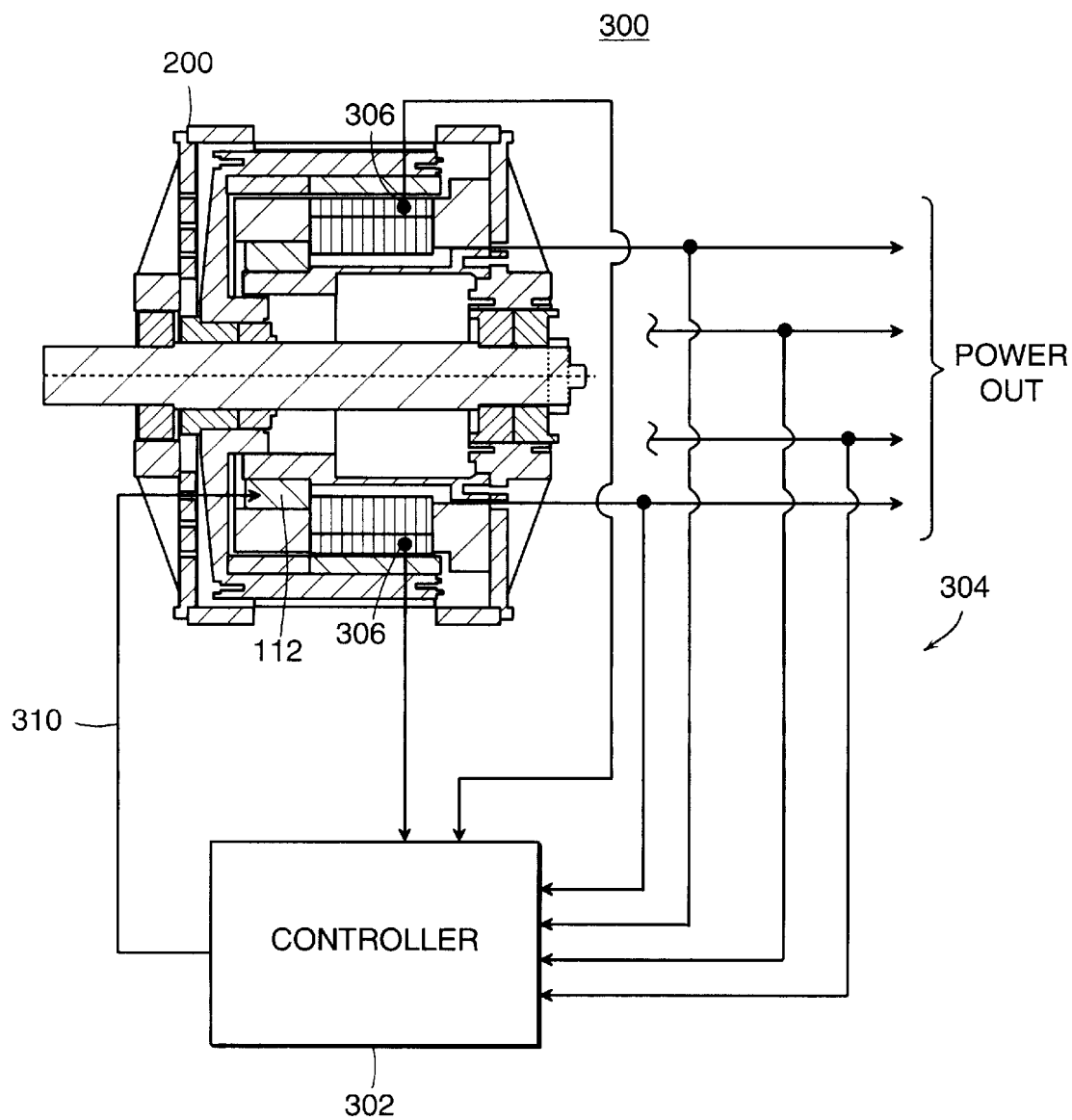
FIG. 8 is a simplified block diagram of the control circuitry that modulates the flux output of the homopolar field winding of a hybrid permanent magnet generator according to the instant invention.

There is shown in FIG. 8 a simplified electrical schematic or block diagram of the control circuitry 300 for modulating the DC flux output of the modulating field winding 112 of a hybrid permanent magnet/homopolar generator 200 of the present invention. Although, the control circuitry 300 is illustrated using one generator embodiment, this is not a limitation as any generator including the above-described features can be used with the control circuitry. The control circuitry 300 includes electrical leads 304 from the power output of the generator 200, a controller 302 and a lead to the modulating field winding 112 to control the DC current flowing therein. The control circuitry 300 also can include a plurality of sensors 306 for sensing short circuit conditions. The controller 302 is any of a number of control circuits or microprocessors that automatically adjust the DC current flowing through the modulating field winding 112 responsive to a sensed change in the terminal voltage from the desired value so as to return and maintain the terminal voltage at the desired value. The controller 302 also evaluates the inputs from the sensors 306 to determine the presence of a short circuit. If a short circuit is detected, then the controller 302 provides an output to the modulating field winding 112 to in effect shut-off the power production capability of the generator as hereinabove described.

In an exemplary embodiment, the short circuit sensors 306 are six search coils that are located at six equally spaced locations around the stator back iron or alternatively on the stator teeth. When the stator winding is operating normally, the net flux linkage of these coils and their terminal voltage will be zero. When an internal short circuit is present in the winding, a terminal voltage should appear and thus indicate the presence of a short circuit.

Figure 9:
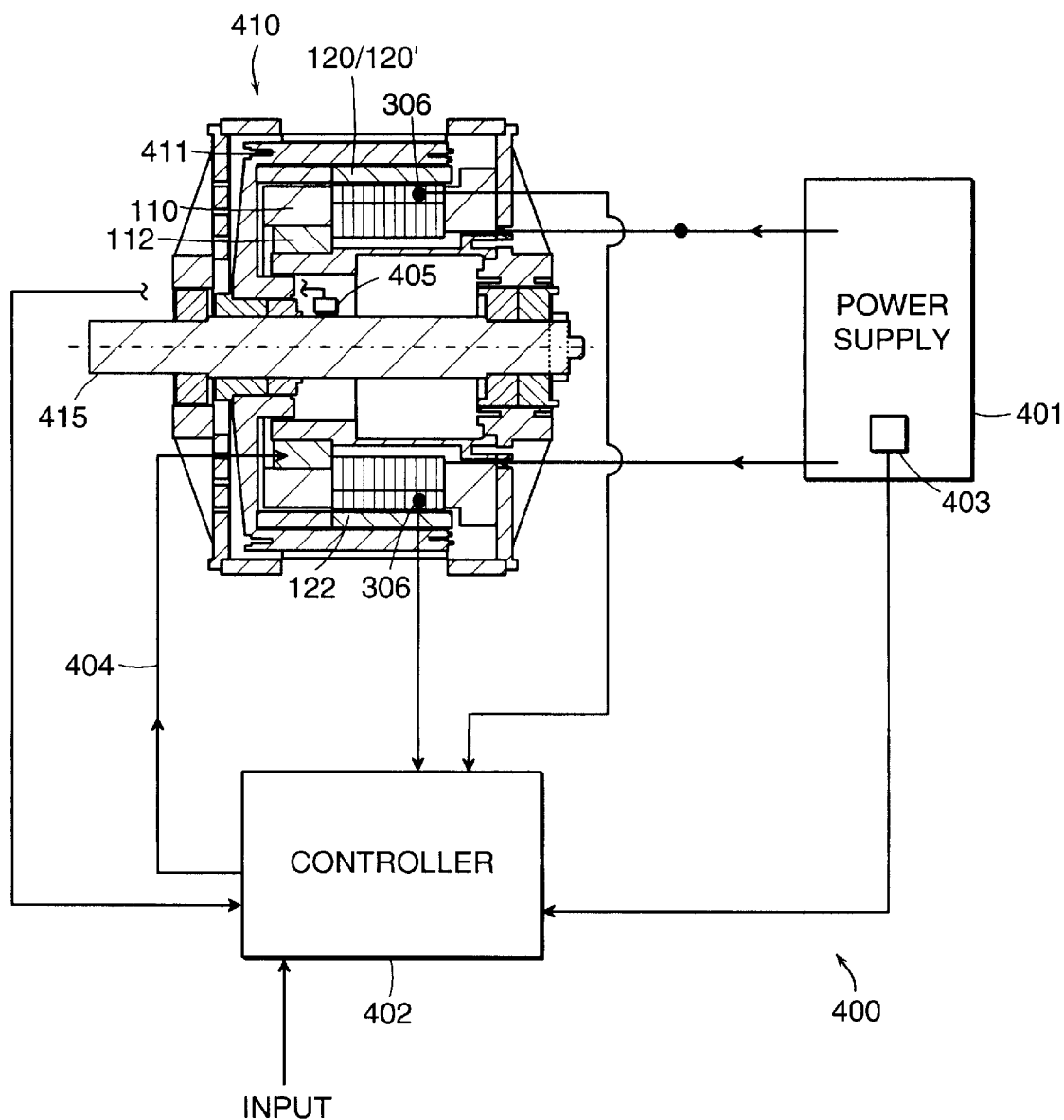
FIG. 9 is a simplified block diagram of the control circuitry that modulates the flux output of the homopolar field winding of a hybrid permanent magnet motor according to the instant invention.

Although the forgoing describes various embodiments of hybrid permanent magnet/homopolar generators, it is within the scope of the instant invention, as illustrated in FIG. 9, to configure the hybrid permanent magnet generators described herein above, for use as a DC or AC motor, more particularly a variable speed DC or AC motor. Such a hybrid permanent magnet/homopolar motor 410 includes a stationary part 102 and a moving part 102. The stationary part 102 includes a stator 110 and a modulation electromagnetic field winding 112 and the moving part includes a rotor 411, a plurality of permanent magnet poles 120' and a plurality of steel poles 122. Reference should be made to the foregoing discussion regarding the power producing devices of the present invention that apply equally for a hybrid permanent magnet/homopolar motor 410 of the present invention.

More particularly, the hybrid permanent magnet/homopolar motor 410 of the present invention is powered by a multi-phase power source 401 having N electrical outputs, where N is at least 2. The stator 110 includes X*N windings 113, disposed within slots in the stator core 111, that are successively and repeatedly connected to the N phases of the power output and where X is a predetermined integer. Further, the rotor 411 carries k permanent magnet poles 120' and k steel poles 122 each being disposed at a radial distance from an axis of concentricity for the rotor 411 and stator 111, where k is an integer≧2 and preferably an integer≧3.

As is known to those skilled in the art, the successive and repeated connection of the stator windings 113 to the power source 401 cause the rotor 411, and correspondingly the drive shaft 415 connected thereto, to rotate. The modulation field winding 112 within the hybrid permanent magnet/homopolar motor 410 adjusts the DC magnetic field so as to regulate the flux emerging from the steel poles 122. The emerging flux is regulated to compensate for changing conditions of the input power parameters, for example a voltage drop, as well to compensate for changes in operating temperature of the permanent magnets 120 and aging of the magnets. In addition, the modulating field winding 112 can be used to adjust the emerging flux as a means for changing the rotational speed of the rotor 411 and thus the motor drive shaft 415 connected thereto without change to the input power parameters.

There is shown in FIG. 9 a simplified electrical schematic or block diagram of the control circuitry 400 for modulating the DC flux output of the modulating field winding 112 of a hybrid permanent magnet/homopolar motor 410 of the present invention. The control circuitry 400 includes a power supply sensor 403, a controller 402, a drive shaft speed sensor 405 and a lead 404 to the motor modulating field winding 112 to control the DC current flowing therein. The control circuitry 400 also can include a plurality of sensors 306 for sensing short circuit conditions. The controller 402 is any of a number of control circuits or microprocessors that automatically adjust the DC current flowing through the modulating field winding 112 responsive to a sensed change in the speed of rotation, responsive to a sensed change in the input parameters from the power supply 401, responsive to a sensed change in drive shaft speed and/or an external input of a desired speed for the motor 410. The controller 402 also evaluates the inputs from the short circuit sensors 306 to determine the presence of a short circuit. If a short circuit is detected, then the controller 302 provides an output to the modulating field winding 112 to in effect shut-off the motor as hereinabove described.

If a speed change is required, then the controller 402 outputs a signal to adjust the DC current flowing through the modulating field winding 112. This in turn alters the flux emerging from the steel poles 122 and correspondingly the net air gap flux density to increase or decrease. The resultant change also causes the speed of the rotor 411 and correspondingly the drive shaft 415 to change. Similarly, if an input parameter of the power supply 401 is altered, for example the input voltage, and it is desired that the rotational speed of the motor 410 be held constant then the DC current is adjusted to accomplish this effect.

If the rotational speed of the motor 410 is to be maintained at a desired value, then the controller 402 evaluates the input from the drive shaft rotational speed sensor 405 to determine if the speed being sensed has changed from the desired value. If so, then the controller 402 outputs a signal to the motor modulating field winding 112 as described above to return and maintain the drive shaft 415 at this speed.

Although a preferred embodiment of the invention has been described using specific terms, such description is for illustrative purposes only, and it is to be understood that changes and variations may be made without departing from the spirit or scope of the following claims.

What is claimed is:

1. An electrical power producing device comprising;
   first and second portions, the portions being arranged so as to have a common long axis and so one portion is moving with respect to the other portion;
   wherein the first portion includes:
      (a) a stator having stator windings, and
      (b) a modulating field winding that generates a magnetic field responsive to a DC current passing therethrough;
   wherein the second portion includes:
      (a) a support member having a mounting surface at a predetermined distance from the common long axis,
      (b) a plurality of permanent magnets disposed on the mounting surface,
      (c) a plurality of steel poles disposed on the mounting surface, and
      (d) wherein the permanent magnets and steel poles are arranged on the mounting surface so as to form an alternation of steel and permanent magnet poles;
   wherein the first and second portions and the support member are configured and arranged:
      (a) so a surface of each permanent magnet and each steel pole oppose a surface of the stator;
      (b) so permanent magnetic flux flows between each permanent magnet, the stator and an adjacent steel pole, adjacent to said each permanent magnet; and
      (c) so the magnetic flux generated by the modulating field winding emerges from each steel pole so as to selectively increase or decrease the permanent magnet flux that is flowing through said each steel pole; and
   wherein the first and second portions and components thereof are arranged structurally and magnetically so the permanent magnetic flux flows primarily circumferentially between each permanent magnet and the adjacent steel pole and so the flux path for the magnetic flux generated by the modulating field winding is primarily axial.

2. An electrical power producing device comprising first and second portions, the portions being arranged so as to have a common long axis and so one portion is moving with respect to the other portion;
   wherein the first portion includes:
      (a) a stator having stator windings,
      (b) a stator support structure, and
      (c) a modulating field winding that generates a magnetic field responsive to a DC current passing therethrough;
   wherein the second portion includes:
      (a) a support member having a mounting surface at a predetermined distance from the common long axis,
      (b) a plurality of permanent magnets disposed on the mounting surface, a plurality of steel poles disposed on the mounting surface,
      (c) wherein the permanent magnets and steel poles are arranged on the mounting surface so as to form an alternation of steel and permanent magnet poles; and
   wherein the first and second portions and the support member are configured and arranged:
      (a) so a surface of each permanent magnet and each steel pole oppose a surface of the stator,
      (b) so permanent magnetic flux flows between each permanent magnet, the stator and an adjacent steel pole, adjacent to said each permanent magnet,
      (c) so the magnetic flux generated by the modulating field winding emerges from each steel pole so as to selectively increase or decrease the permanent magnet flux that is flowing through said each steel pole; and
   so the stator support structure is spaced a predetermined distance from the second portion support structure so the flux path between said each permanent magnet and the adjacent steel pole is primarily circumferential and so the flux path for flux from the modulating field winding is primarily axial.

3. The electrical power producing device of claim 2, wherein there are k permanent magnets and k steel poles, where k is an integer $\geq 2$ and wherein the permanent magnets and steel poles are arranged on the mounting surface so said each permanent magnet is equiangular spaced from each steel pole adjacent thereto.

4. The electrical power producing device of claim 3, wherein the second portion rotates about the common long axis and about the stator.

5. The electrical power producing device of claim 3, wherein the second portion rotates about the common long axis and within the stator.

6. The electrical power producing device of claim 2, wherein the permanent magnets are arranged on the mounting surface so that all permanent magnets have the same direction of magnetization.

7. A method for producing electrical power comprising the steps of:
   providing a power producing device having first and second portions, the portions being arranged so as to have a common long axis and so one portion is moving with respect to the other portion, wherein the first portion includes a stator, and a modulating field winding that generates a magnetic field responsive to a DC current passing therethrough, wherein the second portion includes a support member having a mounting surface at a predetermined distance from the common long axis, a plurality of permanent magnets disposed on the mounting surface, a plurality of steel poles disposed on the mounting surface, and wherein the permanent magnets and steel poles are arranged on the mounting surface so as to form an alternation of steel and permanent magnet poles;

configuring and arranging the first and second portions, (1) so a surface of each permanent magnet and each steel pole oppose a surface of the stator, (2) so permanent magnet flux flows between each permanent magnet, the stator and an adjacent steel pole, and (3) so the magnetic flux generated by the modulating field winding emerges from each steel pole;

flowing the permanent magnetic flux primarily circumferentially between each permanent magnetic and the adjacent steel pole;

flowing the magnetic flux generated by the modulating field winding in a flux path that is primarily axial with respect to the common long axis; and selectively increasing or decreasing the permanent magnet flux through each steel pole using flux generated by the modulating field winding.

8. A method for producing electrical power comprising the steps of:

providing a power producing device having first and second portions, the portions being arranged so as to have a common long axis and so one portion is moving with respect to the other portion, wherein the first portion includes a stator, a stator support structure, and a modulating field winding that generates a magnetic field responsive to a DC current passing therethrough, wherein the second portion includes a support member having a mounting surface at a predetermined distance from the common long axis, a plurality of permanent magnets disposed on the mounting surface, a plurality of steel poles disposed on the mounting surface, and wherein the permanent magnets and steel poles are arranged on the mounting surface so as to form an alternation of steel and permanent magnet poles;

configuring and arranging the first and second portions, (1) so a surface of each permanent magnet and each steel pole oppose a surface of the stator, (2) so permanent magnet flux flows between each permanent magnet, the stator and an adjacent steel pole, and (3) so the magnetic flux generated by the modulating field winding emerges from each steel pole;

wherein the step of configuring and arranging the first and second portions is also done so the stator support structure is spaced a predetermined distance from the second portion support structure so the flux path of the permanent magnetic flux flowing between said each permanent magnet and the adjacent steel pole is primarily circumferential and so the flux path for flux from the modulating field winding is primarily axial; and selectively increasing or decreasing the permanent magnet flux through each steel pole using flux generated by the modulating field winding.

9. The method of claim 8 further including the step of rotating the plurality of permanent magnets and steel poles mounted on the second portion support structure about the common long axis and about the stator.

10. The method of claim 8 further including the step of rotating the plurality of permanent magnets and steel poles mounted on the second portion support structure about the common long axis and within the stator.

11. The method of claim 8, wherein the step of configuring and arranging includes arranging the permanent magnets on the mounting surface so that all permanent magnets have the same direction of magnetization.

\* \* \* \* \*